UNITED STATES PATENT OFFICE.

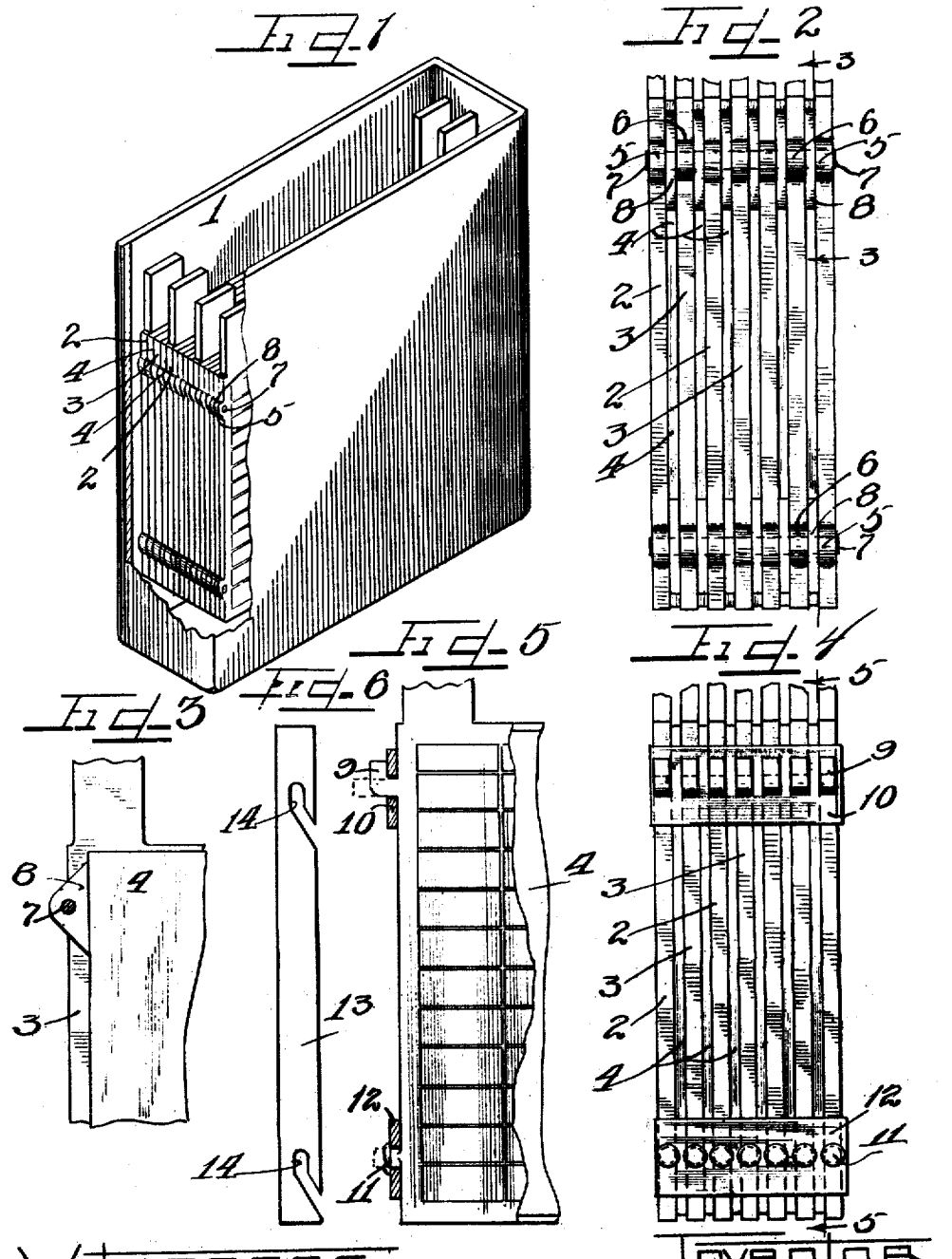

LEE J. PERRY, OF CHICAGO, ILLINOIS, ASSIGNOR TO VESTA ACCUMULATOR COMPANY, OF CHICAGO, ILLINOIS, A CORPORATION OF ILLINOIS.

ACCUMULATOR-CELL.

1,239,513.

Specification of Letters Patent. Patented Sept. 11, 1917.

Application filed March 10, 1916. Serial No. 83,344.

*To all whom it may concern:*

Be it known that I, LEE J. PERRY, a citizen of the United States, and a resident of the city of Chicago, in the county of Cook and State of Illinois, have invented certain new and useful Improvements in Accumulator-Cells; and I do hereby declare that the following is a full, clear, and exact description of the same, reference being had to the accompanying drawings, and to the numerals of reference marked thereon, which form a part of this specification.

This invention relates to an improved construction of an accumulator cell wherein a positive interlocking and spacing mechanism is provided for the positive and negative plates of the cell. Accumulator cells installed on motor cars are subjected to severe usage, and it is particularly desirable to prevent the chafing action which can easily occur between the cell plates and the insulating spacer mats provided therebetween, if a positive connection or clamping means for the suspended plates is not provided on practically all sides thereof. Various devices have been used heretofore to maintain the plates rigidly associated with one another and in proper spaced relation, but in general said means have proved inconvenient in assembling or dismantling the cell.

It is an object therefore of this invention to construct an accumulator cell wherein the elements of the construction are so designed as to provide for the use of a novel interlocking and spacing means for the plates of the cell, so that easy assembly or dismantling of the cell is assured.

It is also an object of this invention to construct an accumulator cell wherein the plates are particularly designed to co-act with an interlocking means which lock the plates properly associated with one another to prevent chafing and yet maintain the same in spaced insulated relation.

It is also an important object of this invention to construct an accumulator cell wherein means are formed on the ends of the respective plates of the cell to receive engaged therewith easily removable interlocking means which co-act with insulating spacer mats between the plates and substantially of the same area as said plates to lock the plates one to another and maintain the same in spaced insulated relation with one another and prevent buckling or warping thereof at the points of support.

It is furthermore an important object of this invention to construct an accumulator cell wherein the plates of the cell are connected to receive detachably connected thereon insulating locking means for locking the plates one to another in spaced relation, co-acting with insulating separating means placed between the plates for the purpose.

It is also an object of this invention to construct a simple and improved type of rigid plate accumulator cell constructed to afford easy assembly and dismantling of the cell.

The invention (in a preferred form) is illustrated in the drawings and hereinafter more fully described.

In the drawings:

Figure 1 is a perspective view broken away of an accumulator cell embodying the principles of my invention, with parts omitted.

Fig. 2 is a fragmentary end view of the plates removed from the cell.

Fig. 3 is a detail section taken on line 3—3 of Fig. 2, with parts omitted.

Fig. 4 is a view similar to Fig. 2, of a modified form of construction.

Fig. 5 is a fragmentary detail section taken on line 5—5 of Fig. 4.

Fig. 6 is a detail view of a modified form of end spacer member.

As shown in the drawings:

The reference numeral 1, indicates the jar or tray of the cell, suspended within which are the positive and negative plates 2 and 3, respectively, arranged in alternate relation and spaced one from another by thin grooved wood mats 4. Both the positive and negative plates 2 and 3, respectively, have formed at the upper and lower portions at each end thereof, eye elements 5 and 6, respectively, which are in register with one another and are adapted to receive an insulating retaining pin 7, inserted therethrough, and interposed between each of the respective eye members are fiber, rubber, celluloid, wood, or other small apertured insulating members 8, also held in position by the retaining pin.

In the modified form of my invention illustrated in Figs. 4 and 5, I have shown the cell plates 2 and 3, provided at their upper ends with soft metal outstanding rectangular lugs 9, which originally are disposed in the dotted line position shown in Fig. 5, and inserted thereover is a flat insulating plate 10, provided with rectangular apertures to fit over said lugs, and after the plate is pressed inwardly closely against the ends of the plates 2 and 3, said lugs are bent upwardly in the position shown in full lines in Figs. 4 and 5. At the lower ends of the respective plates 2 and 3, integral cylindrical pin projections 11, are provided, over which a plate 12, having a row of circular apertures therein, is engaged, to press tightly against the ends of the plates 2 and 3, after which the ends of said pins 11, are hammered or swaged out into the full line position shown, to retain the insulating plates 12, securely thereon.

In the modified form of device illustrated in Fig. 6, a long end insulator and spacer strip 13, to be used in lieu of the small members 8, is provided. As shown, said strip is provided with slots 14, communicating through one edge of said strip permitting the strip to be engaged over the upper and lower pins 7, and wedging tightly between the margins of the cell plates.

The operation of the different types of interlocking plates provided at the ends of the cell plates for interlocking and holding the same in spaced relation is obvious. The particular advantage of the different devices shown over other means heretofore devised, is the facility with which the cells may be assembled and dismantled. In some types of accumulator cells where an interlocking and spacing device of some type or other is used in the ends of the cell plates, the intermediate spacer insulating wood mats are omitted, and vice versa. However, in this invention a combination of the end mechanism and the intermediate wood mats is utilized to provide a cell of the best possible construction.

I am aware that various details of construction may be varied through a wide range without departing from the principles of this invention, and I therefore do not purpose limiting the patent granted otherwise than necessitated by the prior art.

I claim as my invention:

1. In an accumulator cell of the class described, the combination with the cell plates, of intermediate wood separator plates, insulating means associated therewith, means integrally formed on the ends of said cell plates adapted to be interlocked with one another and with said insulating means to coact with said wood separator plates in maintaining the cell plates rigidly associated in proper spaced relation with one another.

2. In an accumulator cell of the class described, the combination with the cell plates and mats provided therebetween, of means on the ends of said cell plates, of insulating members associated with said mats disposed between said means, and interlocking insulating mechanism for engagement with said means and with said insulating members to lock and maintain said cell plates in proper spaced insulated relation.

3. In an accumulator cell construction of the class described, the cell plates, mats interposed therebetween, means formed integrally on the ends of each of said cell plates at the upper and lower ends thereof, insulating members contacting the ends of said mats and disposed between said integral means, and means for engagement with said integral means and with said insulating members to interlock said cell plates one to another and maintain the same in proper spaced relation.

4. In an accumulator cell of the class described, the combination with the cell plates, of mats of substantially the same area as said cell plates interposed therebetween, apertured means disposed at the ends of the cell plates, apertured insulating means abutting the ends of said mats and disposed between said apertured means, and mechanism engaging through all of said apertured means for bridging said cell plates and coacting therewith to maintain the cell plates rigid and in proper spaced insulated relation with one another.

In testimony whereof I have hereunto subscribed my name in the presence of two subscribing witnesses.

LEE J. PERRY.

Witnesses:
 CHARLES W. HILLS, Jr.,
 EARL M. HARDINE.